United States Patent [19]
Takaki et al.

[11] Patent Number: 5,447,175
[45] Date of Patent: Sep. 5, 1995

[54] FUEL DELIVERY DEVICE OF FUEL TANK

[75] Inventors: Hiroshi Takaki; Seiichi Takatsuka, both of Soja, Japan

[73] Assignee: OM Corporation, Okayama, Japan

[21] Appl. No.: 232,821

[22] Filed: Apr. 22, 1994

[30] Foreign Application Priority Data

| Apr. 26, 1993 | [JP] | Japan | 5-021892 |
| Jul. 26, 1993 | [JP] | Japan | 5-040656 |
| Feb. 15, 1994 | [JP] | Japan | 6-018683 |

[51] Int. Cl.⁶ ........................... F16K 31/18
[52] U.S. Cl. ........................ 137/399; 137/433; 137/630.14; 137/630.15; 137/590
[58] Field of Search ........... 137/399, 433, 590, 630.14, 137/630.15, 430; 123/509, 510

[56] References Cited

U.S. PATENT DOCUMENTS

| 1,906,277 | 5/1933 | McGee | 137/433 |
| 2,013,999 | 9/1935 | Hutt | 137/399 |
| 2,325,956 | 8/1943 | Holtman | 137/433 X |
| 2,446,384 | 8/1948 | Murdock | 137/590 X |
| 3,221,800 | 12/1965 | Ballou | 137/590 X |
| 4,342,328 | 8/1982 | Matta | 137/433 X |
| 4,407,642 | 10/1983 | Kemmner | 137/399 X |
| 4,640,306 | 2/1987 | Fan | 137/433 X |
| 4,878,511 | 11/1989 | Fox | 137/38 |
| 4,971,017 | 11/1990 | Beakley et al. | 137/433 X |
| 5,146,947 | 9/1992 | Vetrini | 137/433 |
| 5,236,000 | 8/1993 | Kizer | 137/399 X |

Primary Examiner—John Rivell
Attorney, Agent, or Firm—Koda and Androlia

[57] ABSTRACT

A fuel delivery device is reduced in size by reducing the size of a float, and has reliability in operating its valve means and favorable response of the valve means, and general applicability to various vehicle types. As for a manufacturing method of the device, ultrasonic welding with resin which is the most preferable method considering the material and the cost is employed so that the designed valve opening/closing reliability and response can be easily achieved. For realizing such a device, this invention provides a multi-stage valve assembly in which a plurality of valves are provided, the uppermost valve is connected to a float, and slide members which have stoppers provided on the distal ends thereof and are provided on one of the valves which make a pair, are inserted in guide members provided on the other valve in such a manner that the stoppers can be engaged with the guide members. It may be a two-stage valve assembly in which a secondary valve and a primary valve are disposed concentrically and operated in association with each other, or a three-stage valve assembly comprising a secondary valve, an intermediate valve and a primary valve.

4 Claims, 13 Drawing Sheets

FUEL DELIVERY DEVICE OF FUEL TANK

BACKGROUND OF THE INVENTION

The present invention relates to a fuel delivery device of a fuel tank for a vehicle, which supplies fuel to an engine.

Conventionally, a fuel delivery device of a fuel tank has controlled fuel supply to an engine from the fuel tank by opening/closing valve means so that especially when the fuel in the tank is decreased, air will not be delivered to the engine. Utilizing vertical movement of a float connected to the valve means, the valve means are opened/closed due to the relationship between negative pressure of a valve seat where the fuel is sucked and buoyancy of the float. More specifically, when the fuel tank contains sufficient fuel, the buoyancy of the float exceeds the negative pressure of the valve seat, and the float is detached from the valve seat. When the fuel in the tank is decreased, the negative pressure of the valve seat exceeds the buoyancy of the float, and the float is drawn and attached to the valve seat.

In order to operate the valve means reliably, vertical movement of the float should preferably be determined in one direction. Therefore, the float is usually surrounded by float guides so as to fix the direction of its vertical movement. By controlling a gap between the float and the float guides, the movement smoothness and the response speed of the float are determined.

SUMMARY OF THE INVENTION

Important factors for a fuel delivery device are response and reliability of its valve means, material cost in relation to size reduction of the device, and operational cost in relation to machining accuracy at the time of assembly and manufacture of the device.

Firstly, there was studied a fuel delivery device which is reduced in size by reducing the size of a float and which has reliability in operating its valve means and favorable response of the valve means.

The study resulted in a fuel delivery device of a fuel tank wherein secondary valve means are connected to a float, the secondary valve means including a small-diameter secondary valve and slide members having stoppers provided on the distal ends thereof, and a primary valve is connected to the secondary valve, the primary valve including a secondary valve seat of the secondary valve and guide members in which the slide members are inserted and with which the stoppers are engaged, so that the secondary valve and the primary valve are operated in association with each other.

In this device, preferably, the float has a cylindrical shape, the secondary and primary valves have disk shapes concentric with the float, and the float, the secondary valve and the primary valve are vertically connected in this order. Also, preferably, the slide members are disposed on the periphery of the secondary valve symmetrically with respect to the center of the secondary valve, and the secondary valve seat is provided in the center of the primary valve while the guide members are located in positions on the primary valve corresponding to positions of the slide members.

The valve seat of the small-diameter secondary valve has a small attraction force and a high flow resistance. The valve seat of the large-diameter primary valve has a large attraction force but a low flow resistance. Consequently, when the fuel tank contains sufficient fuel, the secondary valve with the valve seat having the small attraction force is opened first to lessen a difference between internal and external pressures of the chamber, thereby opening the large-diameter primary valve easily. When the fuel in the tank is decreased to such a level that the primary valve having the low flow resistance is not opened, only the secondary valve with the valve seat having the small attraction force is opened/closed with a quick response because the flow resistance of the secondary valve is considerably lowered. Thus, even if the float is reduced in size, quick opening/closing operation of the valve means can be performed in accordance with an amount of the remaining fuel in the tank.

Secondly, taking into account a difference of fuel suction forces of the engine owing to a difference of vehicle types, a fuel delivery device which has (1) favorable response and reliability, (2) a small size to be manufactured and assembled easily, and (3) general applicability to various vehicle types, was studied on the basis of the above-described fuel delivery device with the two valves.

The resultant fuel delivery device of a fuel tank including a plurality of valves has a multi-stage valve assembly in which the uppermost valve is connected to a float, and slide members which have stoppers provided on the distal ends thereof and are provided on one of the valves which make a pair, are inserted in guide members provided on the other valve in such a manner that the stoppers can be engaged with the guide members.

More specifically, a preferable form of this device is a fuel delivery device of a fuel tank, which has a three-stage valve assembly comprising a secondary valve, an intermediate valve and a primary valve, in which the secondary valve has a small diameter and includes slide members having stoppers provided on the distal ends thereof, the primary valve has a large diameter and includes guide members, and the intermediate valve has a diameter larger than the secondary valve and smaller than the primary valve and includes slide members having stoppers provided on the distal ends thereof and guide members, the valves being connected by connecting the secondary valve to the float, inserting the slide members of the secondary valve in the guide members of the intermediate valve, and inserting the slide members of the intermediate valve in the guide members of the primary valve.

In this fuel delivery device having the three-stage valve assembly, the slide members and the guide members have substantially the same shapes and are all located concentrically, so that even if the intermediate valve is omitted, the secondary valve can be connected to the primary valve, and that component parts can be used in common with the fuel delivery device having the two-stage valve assembly. Moreover, when the slide members and the guide members have the foregoing relationship, the secondary valve, the intermediate valve and the primary valve which have different opening areas can be combined.

Thirdly, taking into account the relationship of the gap between the float and the float guides with the valve opening/closing reliability and response, shapes of connection surfaces of the cylinder and the disk were studied so that the designed valve opening/closing reliability and response can be easily achieved by the conventional manufacturing method such as ultrasonic welding or the like.

As a result, there was developed a fuel delivery device of a fuel tank, characterized in that a float of valve means for opening/closing an intake port comprises a top-open or bottom-open cylinder and a disk, and a projecting portion is formed on the outer peripheral edge of the disk so that the disk has a slightly larger diameter than the side surface of the cylinder.

In the case of a float made of a bottom-open cylinder, for example, the side surface of the cylinder and the outer peripheral edge of the disk form a smooth continuous surface if they are connected as designed. This continuous surface is at a uniform distance from any of the float guides, and the projecting portion of the outer peripheral edge of the disk becomes a stepped portion having a generally convex cross-sectional shape which is formed on the continuous surface. Therefore, this projecting portion is in sliding contact with the float guides, and its friction is extremely small.

Even if an edge-like end portion or burr is exposed from or formed on the connection surfaces of the cylinder and the disk during the manufacture, the foregoing projecting portion prevents the float from abutting against the float guides so that movement of the float will not be interfered. Further, the gap between the distal end of the projecting portion and the side surface of the cylinder absorbs a deviation in connection of the cylinder and the disk, thus maintaining the surface continuity from the side surface of the cylinder to the outer peripheral edge of the disk.

DETAILED DESCRIPTION OF THE PREFERRED EMBODIMENTS

Figure 1:
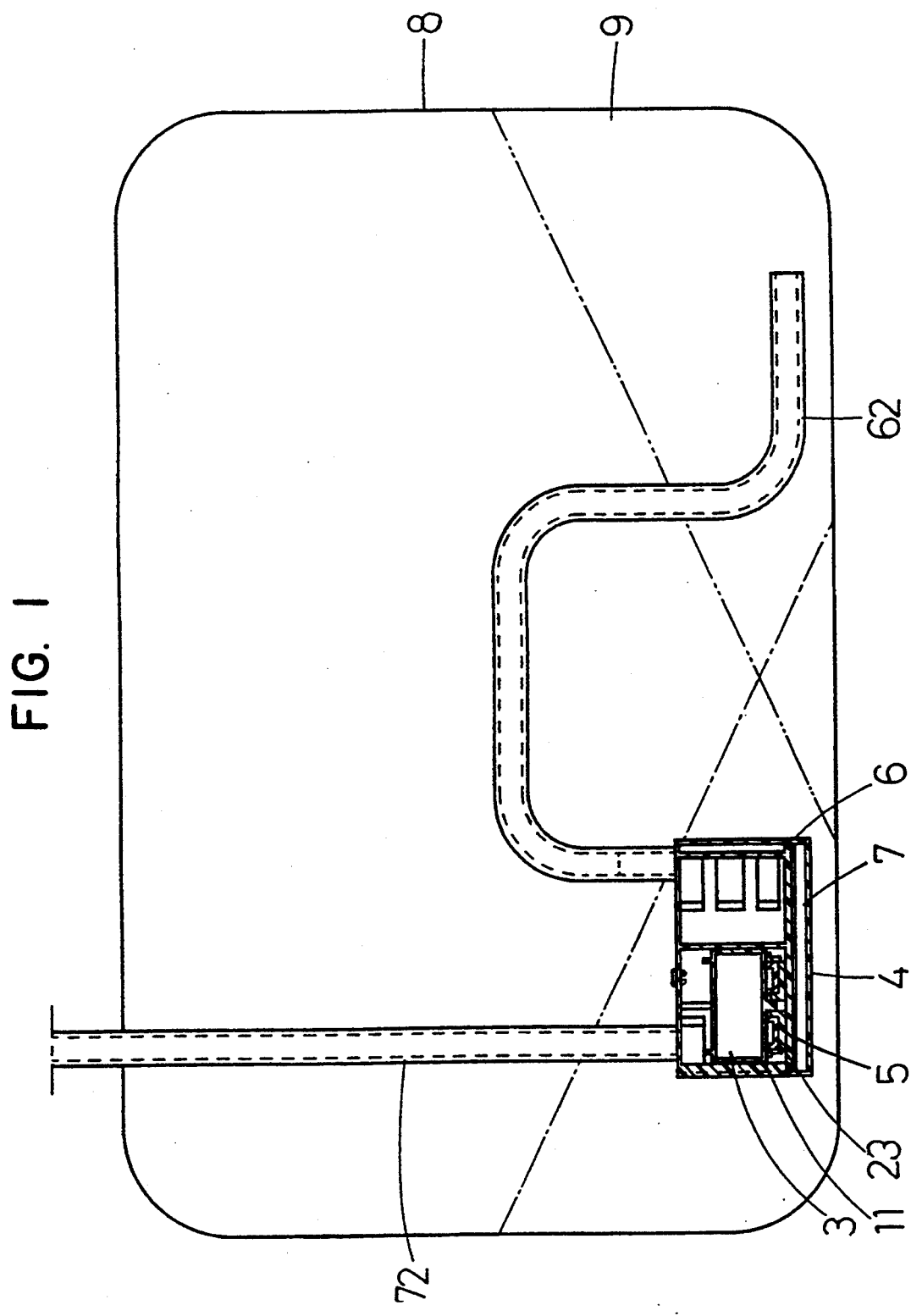
FIG. 1 is a front, vertical cross-sectional view of a fuel tank in which a fuel delivery device having a two-stage valve assembly according to the present invention is provided.

Important factors for a device are its performance and price. For a fuel delivery device, the performance concerns response and reliability of its valve means, and the price concerns material cost in relation to size reduction of the device, and operational cost in relation to machining accuracy at the time of the assembly and manufacture of the device.

First, the performance of the fuel delivery device will be explained.

A flow resistance of fuel passing through a valve seat is inversely proportional to an opening area of the valve seat. Therefore, the larger the opening area of the valve seat is, the better. On the other hand, a negative pressure of the valve seat with respect to buoyancy of a float is proportional to the opening area of the valve seat. That is to say, a valve seat of a larger diameter has a higher negative pressure, and consequently, a float of a larger size is required for quickening the valve opening/closing response.

However, as the size of the float is increased, the whole fuel delivery device is enlarged, increasing the price of the device disadvantageously. As for the performance, for example, as the fuel delivery device is enlarged, an amount of the remaining fuel required for operating the device is increased, thereby limiting the range of favorable operation. Therefore, investigation was given on a fuel delivery device which is reduced in size by reducing the size of a float and which has reliability in operating its valve means and favorable response of the valve means. As a result, the following fuel delivery device was developed. It will now be described with reference to the attached drawings.

As shown in FIGS. 1 to 4, the fuel delivery device has a casing 4 an upper portion of which is partitioned into a float chamber 5 and a sub-chamber 6. A float 3, a primary valve 23 and a secondary valve 11 are accommodated in the float chamber 5. A chamber 7 for communicating the float chamber 5 and the sub-chamber 6 with each other is formed in a lower portion of the casing 4. A mesh 51 serving as a dust filter is attached to the outer periphery of the float chamber 5. Float guides 52 are provided in the float chamber 5 so as to restrict movement of the incorporated float 3 to vertical directions. A fuel intake pipe 62 bent in a U-shape is connected to the sub-chamber 6 which is isolated from the fuel in a fuel tank 8 by a wall. A mesh 61 serving as a dust filter is provided between the fuel intake pipe 62 and the chamber 7 which communicates with the sub-chamber 6. Further, a small-diameter check valve 53 is arranged on the upper surface of the float chamber 5, and a large-diameter sealed check valve 63 is provided on the upper surface of the sub-chamber 6, thereby releasing stagnant air from the casing 4.

Figure 2:
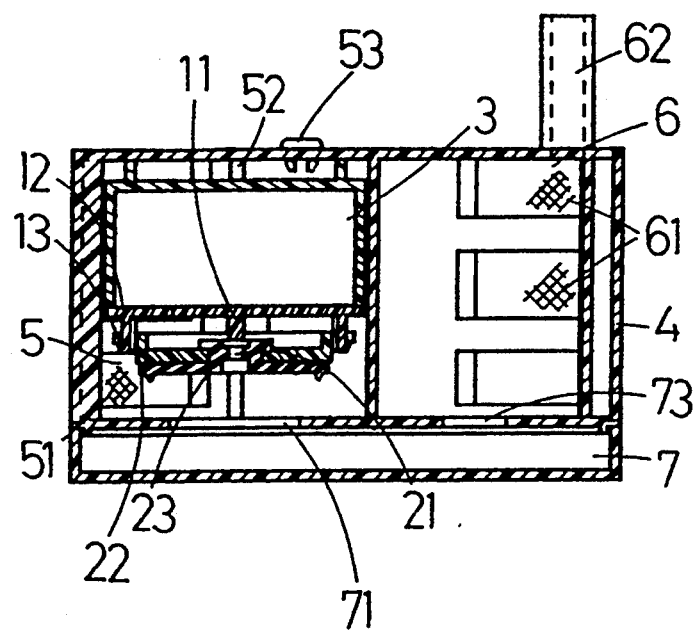
FIG. 2 is a front, vertical cross-sectional view of the fuel delivery device when the fuel tank contains sufficient fuel.
Figure 3:
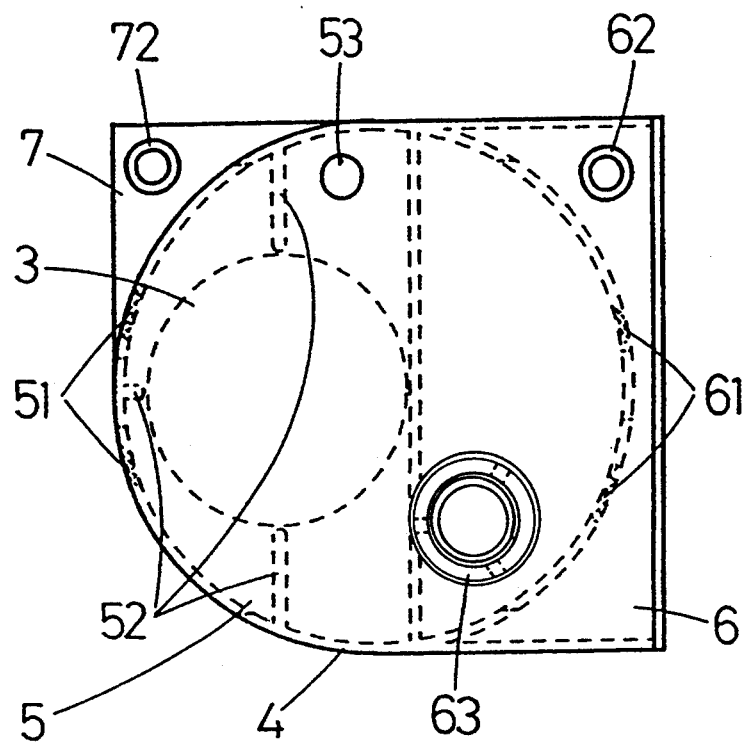
FIG. 3 is a plan view of the device.
Figure 4:
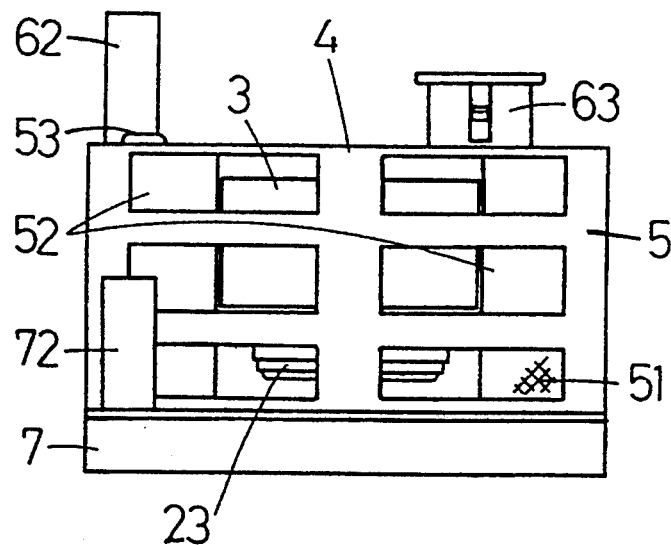
FIG. 4 is a left side view of the device.

As shown in FIGS. 2 and 3, the float 3 has a cylindrical shape, and the secondary valve 11 is disposed on the center of the lower surface of the float 3 so as to project from the same. Slide members 12 having a substantially arcuate cross-sectional shape are provided on four portions of the outer periphery of the lower surface of the float 3. A stopper 13 is formed on the distal end of each of the slide members 12. Primary valve means 23 consisting of a secondary valve seat 21 formed in the center thereof and the primary valve 23 are located below the secondary valve 11. A primary valve seat 71 communicating with the chamber 7 is formed in the lower surface of the float chamber 5.

The slide members 12 of secondary valve means 11 are inserted in associated guide members 22 of the primary valve 23 so that the stoppers 13 can be engaged with the guide members 22. The primary valve 23 reacts to the float 3 later than the secondary valve 11 by a degree corresponding to the length of the slide members 12.

When a sufficient amount of fuel 9 is in the fuel tank 8, as shown in FIG. 2, the float 3 floats to open the primary valve 23. The fuel 9 flows into the device from the float chamber 5 through the mesh 51, sucked into the chamber 7 from the primary valve seat 71, and is supplied to an engine via a fuel supply pipe 72. In this case, the primary valve seat 71 of the float chamber and a communication hole 73 of the sub-chamber which communicate with the chamber 7 are designed in such a manner that the flow resistance of the former is considerably smaller. Therefore, fuel is not supplied via the fuel intake pipe 62.

Figure 5:
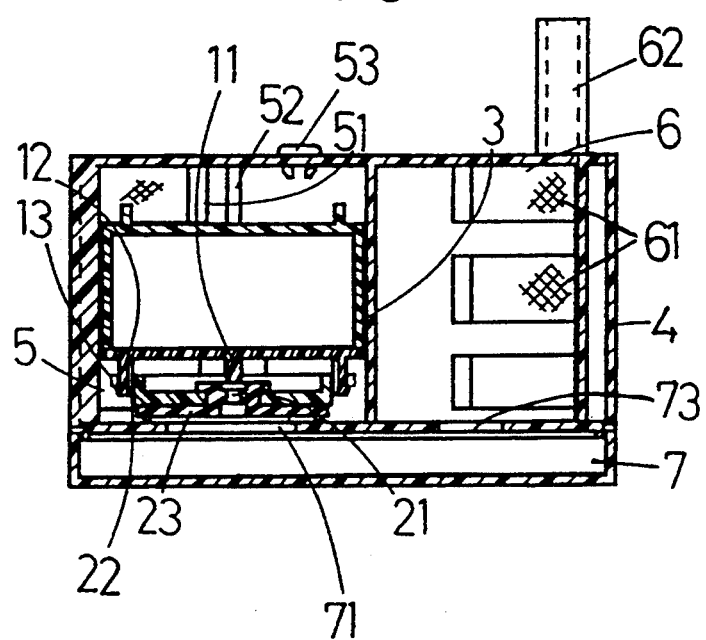
FIG. 5 is a front, vertical cross-sectional view of the fuel delivery device when the fuel in the tank is decreased.

When the amount of the fuel 9 is decreased, as shown in FIG. 5, the float 3 does not float to a very high level, and consequently, only the secondary valve 11 is opened. In substantially the same manner as described above, the fuel 9 is supplied to the engine by way of the mesh 51, the float chamber 5, the secondary valve 11, the chamber 7 and the fuel supply pipe 72. In this state, the fuel is also supplied via the fuel intake pipe 62 because the secondary valve seat 21 and the communication hole 73 of the sub-chamber which communicate with the chamber 7 are designed to have similar flow resistances.

Figure 6:
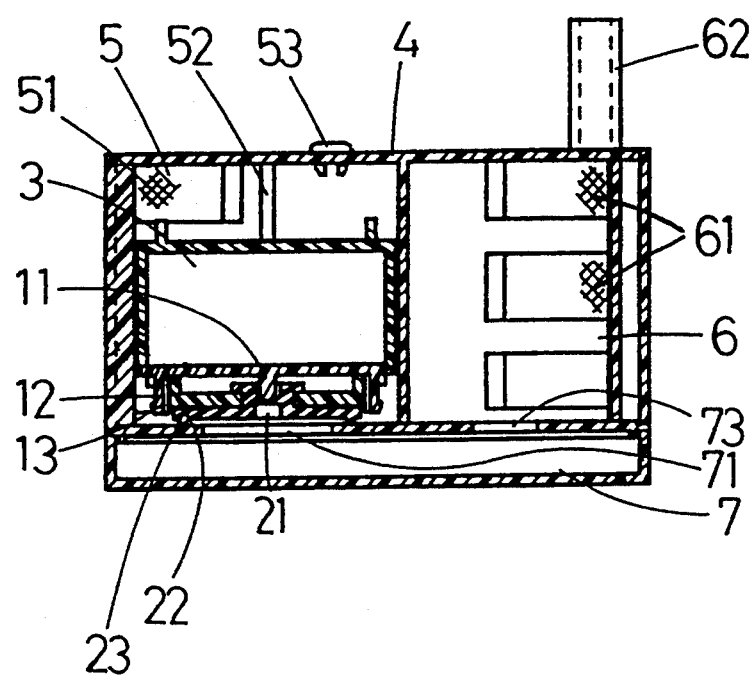
FIG. 6 is a front, vertical cross-sectional view of the fuel delivery device when the fuel in the tank is further decreased.

When the amount of the fuel 9 is further decreased, as shown in FIG. 6, the float 3 does not float, thereby closing both the secondary valve 11 and the primary valve 23. Although fuel is no longer supplied from the float chamber 5, the fuel 9 can be supplied to the engine by way of the fuel intake pipe 62, the sub-chamber 6, the mesh 61, the chamber 7 and the fuel supply pipe 72.

In the fuel tank 8, as shown in FIG. 1, the fuel delivery device is disposed on the left of the tank, and the intake end of the fuel intake pipe 62 is disposed on the right of the tank. For example, when the fuel is moved to one side, as indicated by a chain line in the drawing, the float 3 floats to open the primary valve 23, and the fuel 9 is supplied to the chamber 7 from the float chamber 5. When the fuel is moved to the other side, as indicated by a chain double-dashed line in the drawing, the float 3 does not float, thereby closing both the primary and secondary valves 23 and 11. The fuel 9 is supplied to the chamber 7 from the fuel intake pipe 62 and the sub-chamber 6.

Even if air is sucked from the fuel intake pipe 62, air in the chamber 7 is released to the float chamber 5 and the sub-chamber 6 so as not to deliver air into the fuel supply pipe 72. The air released to the float chamber 5 and the sub-chamber 6 is discharged into the fuel tank 8 through the check valves 53 and 63, respectively. The sub-chamber 6 serves not only as an air receptor between the fuel intake pipe 62 and the chamber 7 but also as one part of the fuel passage when the fuel is sucked from the fuel intake pipe 62. Therefore, the check valve 63 requires fluid-tightness.

In this manner, the valve assembly in the fuel delivery device is divided into a plurality of stages so that higher response and reliability of valve opening/closing operation can be realized by a smaller float. That is to say, the float can be operated even with a smaller amount of the remaining fuel, and the fuel can be constantly supplied to the engine even if the amount of the fuel in the tank is smaller than the conventional level. Moreover, the fuel delivery device can be reduced in size.

Further, by providing the chambers in the above-described manner, delivery of air to the engine can be prevented almost completely. This exhibits reliability of the fuel delivery device. Especially, even if a vehicle with less fuel in the tank is tilted or turned, only the fuel can be supplied to the engine with reliability.

On the other hand, a fuel suction force from the engine as well as the opening area of a valve seat is a factor for determining valve opening/closing response and reliability in the fuel delivery device. Since methods of fuel supply to engines vary in accordance with differences of vehicle types, their fuel suction forces are also different. Attachment of the fuel delivery device involves no problem caused by the difference in the vehicle types. Due to the difference in the fuel suction forces, however, even if valve opening/closing operation has no problem in one vehicle type, another vehicle type may have a problem that a difference between internal and external pressures of the device is not lessened by opening a secondary valve and supplying fuel to the engine, and that a primary valve is not opened so that sufficient fuel can not be supplied.

This problem is caused for the following reason. To open a valve, buoyancy of a float must exceed a force by which the valve is attracted to the valve seat due to the fuel suction force of the engine (hereinafter referred to as the attraction force which is the product of a negative pressure and an opening area of the valve). Since a secondary valve has a small opening area, the attraction force is small, and the secondary valve can be opened even by a small float. However, the attraction force of a primary valve having a large opening area is smaller than the float buoyancy so that the primary valve can not be opened.

The fuel delivery device which is one component of the vehicle should have (1) favorable response and reliability, (2) a small size to be machined and assembled easily, and (3) general applicability to various vehicle types. Therefore, a device structure, especially a valve structure, which satisfies the foregoing conditions for general use was investigated on the basis of the above-described fuel delivery device with the two valves. As a result, the following fuel delivery device was developed.

Figure 7:
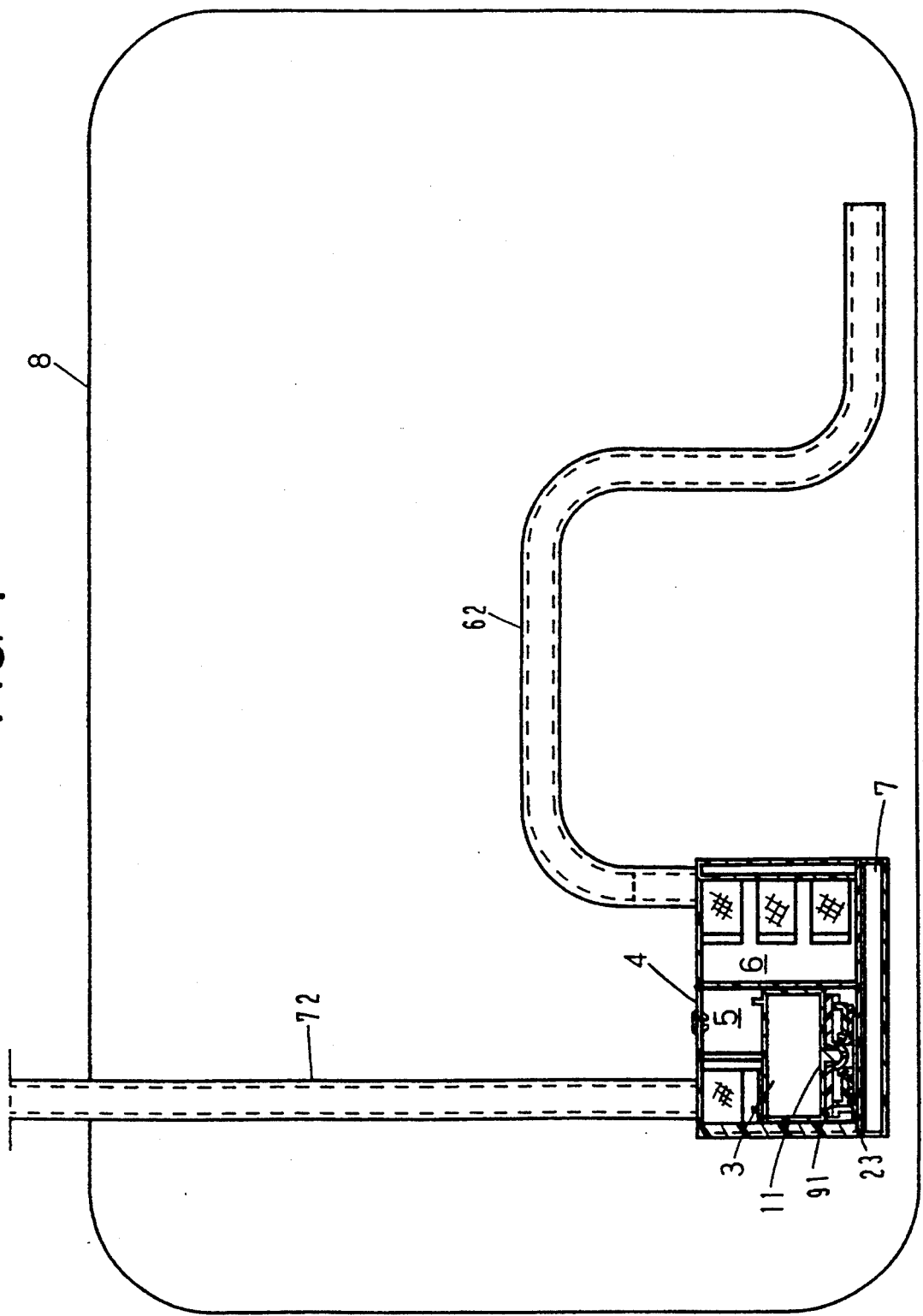
FIG. 7 is a referential cross-sectional view of a fuel delivery device having a three-stage valve assembly which is disposed in a fuel tank.
Figure 8:
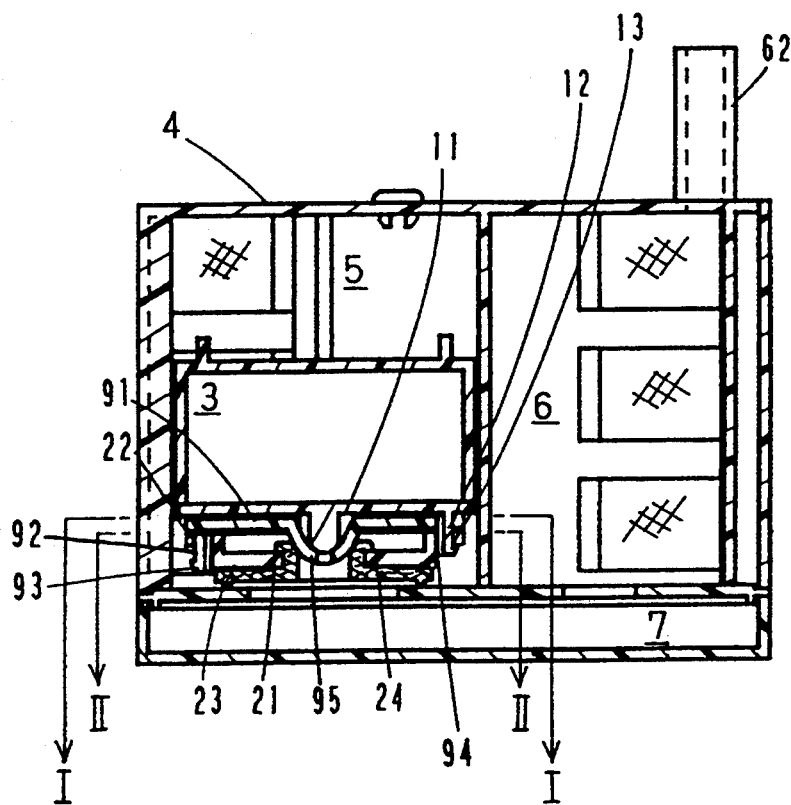
FIG. 8 is an enlarged cross-sectional view of the fuel delivery device having the three-stage valve assembly in which all the valves are closed.

As shown in FIGS. 7 and 8, the fuel delivery device is provided in a fuel tank 8. The device has a casing 4 divided into a float chamber 5, a sub-chamber 6 and a chamber 7. A fuel intake pipe 62 is connected to the sub-chamber 6, and a fuel supply pipe 72 for supplying fuel to the engine is connected to the chamber 7. Valve means are a three-stage assembly comprising a secondary valve 11, an intermediate valve 91 and a primary valve 23, which are received in the float chamber 5.

Figure 9:
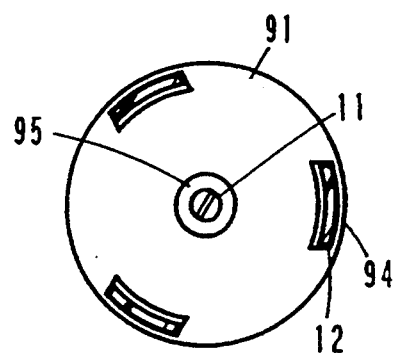
FIG. 9 is a cross-sectional view of a valve portion, taken along the line I—I in FIG. 8.

As shown in FIG. 8, the secondary valve 11 is attached to the lower surface of a float 3 having a hollow structure whose horizontal cross section is circular, and a valve member of the secondary valve 11 projects downwardly from the center. Slide members 12 of an arcuate cross-sectional shape are provided in three uniformly spaced positions on a concentric circle close to the outer periphery of the secondary valve 11, and the slide members 12 project downwardly and have stoppers 13 formed on the distal ends thereof. As shown in FIG. 9, the slide members 12 are inserted in guide members 94 arranged close to the outer periphery of the intermediate valve 91 so that the stoppers 13 can be engaged with the guide members 94, thereby connecting the secondary valve 11 with the intermediate valve 91.

Figure 10:
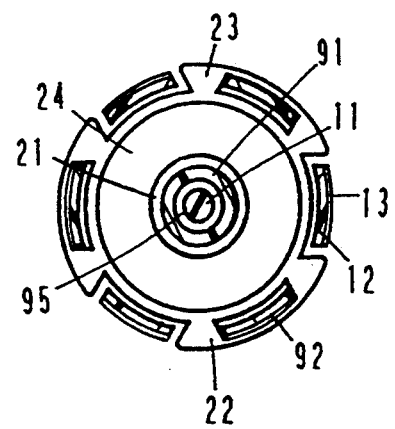
FIG. 10 is a cross-sectional view of a valve portion, taken along the line II—II in FIG. 8.

A central portion of the intermediate valve 91 has a concave shape corresponding to the shape of the secondary valve 11, and a valve seat 95 for the secondary valve 11 is formed on an end of this concave portion. The concave shape of the valve seat 95 is such that the structural thickness of the whole valve means will not be increased. Slide members 92 of an arcuate cross-sectional shape are provided in three uniformly spaced positions on a concentric circle close to the outer periphery of the intermediate valve 91 and deviated from the slide members 12 of the secondary valve 11 by 60 degrees, and the slide members 92 project downwardly and have stoppers 93 formed on the distal ends thereof. As shown in FIG. 10, the slide members 92 are inserted in guide members 22 arranged close to the outer periphery of the primary valve 23 so that stoppers 93 can be engaged with the guide members 22, thereby connecting the intermediate valve 91 with the primary valve 23.

Figure 11:
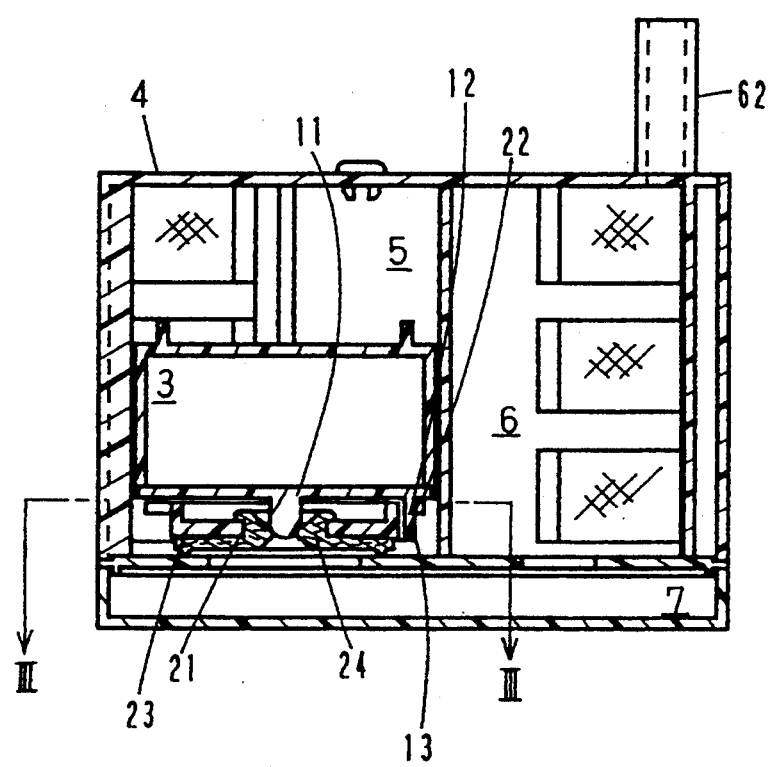
FIG. 11 is an enlarged cross-sectional view of the fuel delivery device having the two-stage valve assembly in which all the valves are closed.
Figure 12:
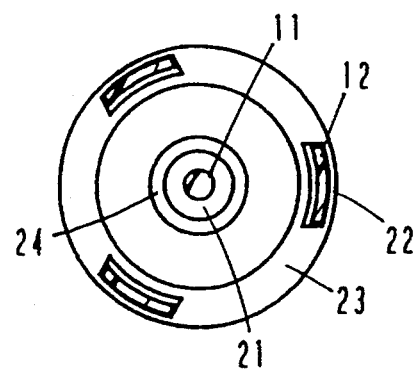
FIG. 12 is a cross-sectional view of a valve portion, taken along the line III—III in FIG. 11.

That is to say, the slide members 12 of the secondary valve 11 and the slide members 92 of the intermediate valve 91 are located at the positions which are 60 degrees deviated from each other, and when, for example, the intermediate valve 91 is omitted and the secondary valve 11 is directly inserted in the guide members 22 of the primary valve 23, a device having a two-stage valve assembly can be easily constructed, as shown in a cross-sectional view of FIG. 11 and a cross-sectional view of FIG. 12 taken along the line III—III of FIG. 11. Thus, cost reduction can be achieved by using component parts in common, and also, the number of procedures for assembling the device can be decreased.

A packing member 24 made of rubber is attached to the primary valve 23 so as to reliably close a valve seat 71 for the primary valve which is formed in the upper surface of the chamber 7. A valve seat 21 corresponding to the intermediate valve 91 is opened in the center of the packing member 24. The secondary, intermediate and primary valves 11, 91 and 23 are made of plastic material, and it is difficult to operate these valves in the fuel and maintain their tightness. Therefore, by providing the primary valve 23 having a large opening area with the rubber packing member 24 and also by forming the valve seat 21 on the packing member 24, tightness of the primary valve 23 and the intermediate valve 91 is obtained. If necessary, the secondary valve may also be covered with a rubber packing member.

Figure 13:
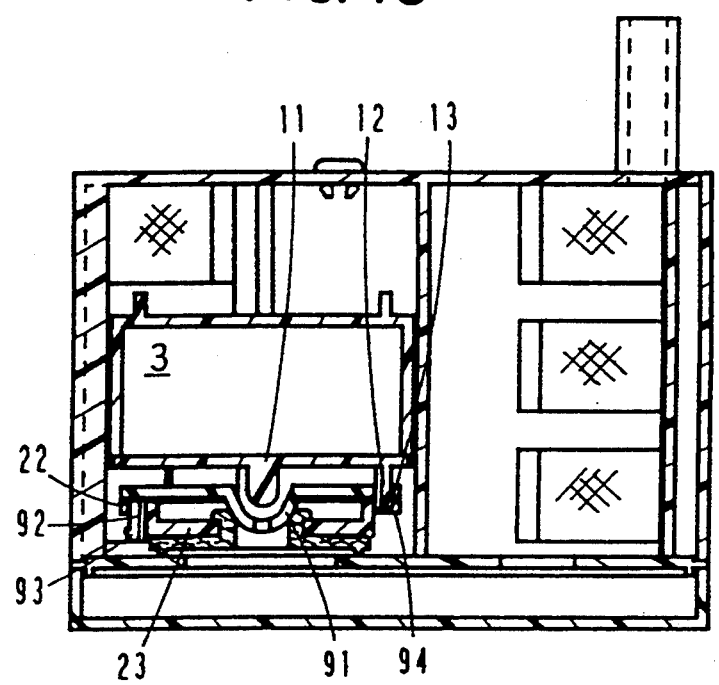
FIG. 13 is an enlarged cross-sectional view of the fuel delivery device having the three-stage valve assembly in which a secondary valve is opened.

The fuel delivery device having the three-stage valve assembly described above is operated in the following manner. When the fuel tank 8 shown in FIG. 7 with a small amount of remaining fuel is inclined to the right, as viewed in FIG. 7, all the valves of the device are closed, as shown in FIG. 8. However, when the fuel tank 8 in the foregoing state is slightly inclined to the left and buoyancy begins to be applied to the float, the secondary valve 11 is raised and opened due to the buoyancy of the float, as shown in FIG. 13.

Figure 14:
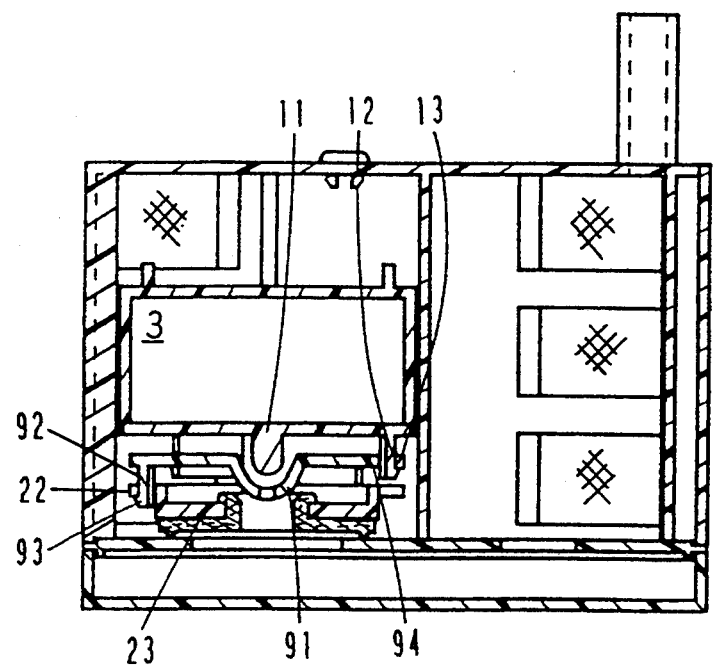
FIG. 14 is an enlarged cross-sectional view of the fuel delivery device having the three-stage valve assembly in which an intermediate valve is opened.
Figure 15:
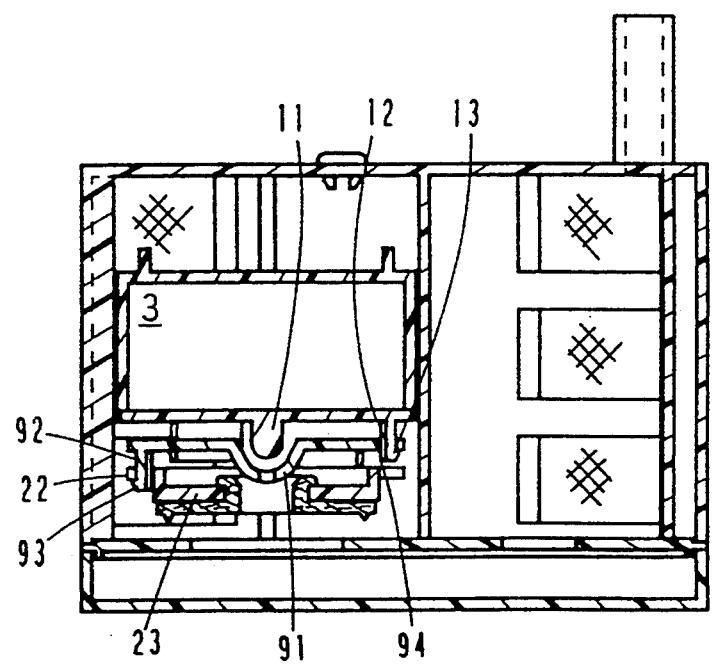
FIG. 15 is an enlarged cross-sectional view of the fuel delivery device having the three-stage valve assembly in which a primary valve is opened.

When the buoyancy of the float further increases, as shown in FIG. 14, the secondary valve 11 raises the intermediate valve 91, thereby opening the intermediate valve 91. Since the opening area of the intermediate valve 91 is smaller than that of the primary valve 23, the intermediate valve 91 can be opened even if a difference between internal and external pressures of the device is so large that the primary valve 23 can not be opened. Consequently, when the pressure difference is small, the intermediate valve 91 raises the primary valve 23, and the primary valve 23 can be opened, as shown in FIG. 15. However, when the pressure difference is unchanged and still large, the device in the state shown in FIG. 14 continues to supply the fuel to the engine.

When a pressure difference is caused to hinder opening of the primary valve 23, provision of the intermediate valve 91 is effective. However, if the primary valve 23 can be opened even with the maximum pressure difference, the intermediate valve 91 is unnecessary, and therefore, a device of the two-stage valve assembly comprising the secondary valve 11 and the primary valve 23, as shown in FIG. 11, is employed. The device according to the present invention is characterized in that the valve structure can be easily changed, and that the cost of the device can be reduced by using component parts in common and simplifying the assembly procedures.

The above-described fuel delivery device is improved in relation to malfunction of the valve means induced when the difference of internal and external pressures of the device is large. Even with the pressure difference which has conventionally deteriorated operation of the primary valve or hindered opening of the primary valve, operational reliability of the device can be ensured by opening the intermediate valve. Since the intermediate valve has a smaller diameter than the primary valve and a relatively small thickness, the structure of the device can be kept small advantageously.

Moreover, the intermediate valve having the foregoing function is connected with the secondary valve and with the primary valve in substantially the same manner. Therefore, the device of the three-stage valve assembly including the intermediate valve or the device of the two-stage valve assembly can be adopted as situations demand, so that the cost of the device can be reduced by using component parts in common and simplifying the assembly procedures.

Now will be described the performance of the fuel delivery device. In some cases, even if opening diameters of the valve seats are determined in the conventional manner, a designed performance can not be obtained when component parts are actually machined and assembled. A gap between a float and float guides is a typical example. If this gap is too large, the float does not move smoothly and favorably, thereby deteriorating reliability of valve opening/closing operation. On the contrary, if the gap is too small, friction with the float guides is too large, and consequently, response of the float, i.e., valve opening/closing response is degraded. In designing the device, dimensions of component parts are determined considering errors in machining and assembling the component parts. However, deviations from the designed dimensions are caused after machining and assembling the component parts, slightly deteriorating the opening/closing reliability and response of the float, i.e., the valve means.

Figure 21:
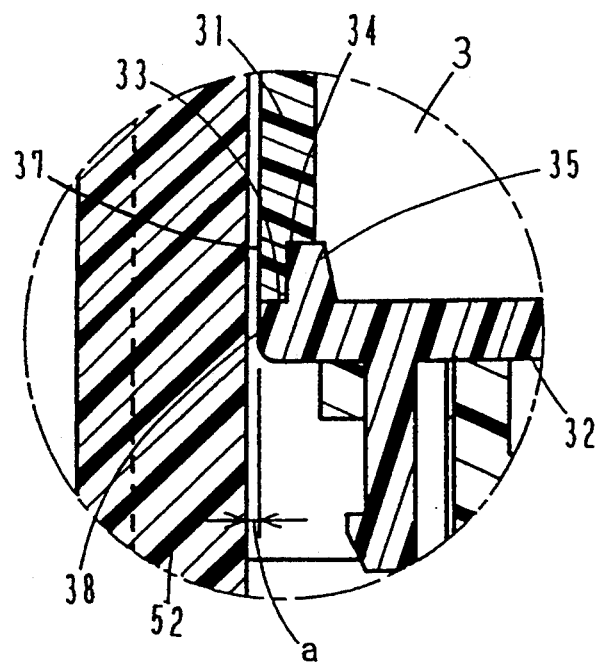
FIG. 21 is an enlarged cross-sectional view of an essential portion of connection surfaces of a conventional float.
Figure 22:
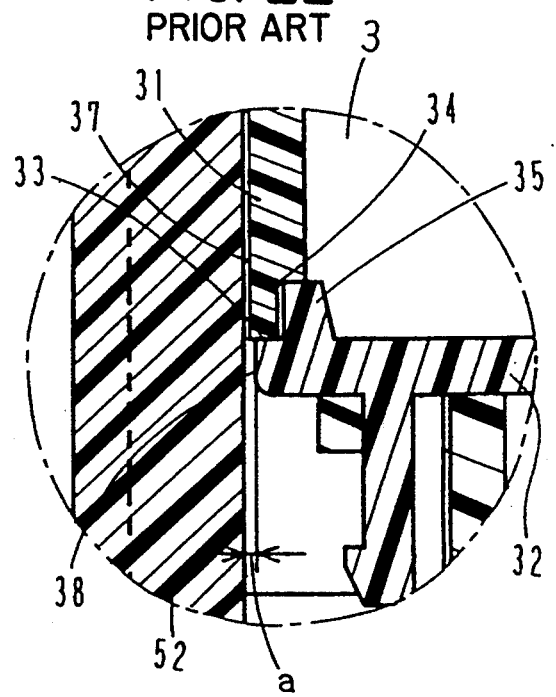
FIG. 22 is an enlarged cross-sectional view of the essential portion of the connection surfaces of the conventional float where a cylinder and a disk are connected in a deviated manner.

Further, as shown in FIGS. 21 and 22, a float for general use which can be formed by ultrasonic welding of a bottom-open cylinder and a bottom-cover disk, for example, involves the following problems.

(1) Burrs generated on the welded portion influences movement of the float. Therefore, burr removing operation is usually necessary.

(2) In the worst case, an edge-like end portion which is exposed from the float by erroneous welding is caught by the float guides, thus interrupting movement of the float.

As for the manufacturing method, it is practical to adopt the above-mentioned ultrasonic welding or the like considering both the material and the cost. Shapes of connection surfaces of the cylinder and the disk were investigated so that the designed valve opening/closing reliability and response could be easily achieved by the conventional manufacturing method. As a result, the following fuel delivery device was developed.

Figure 16:
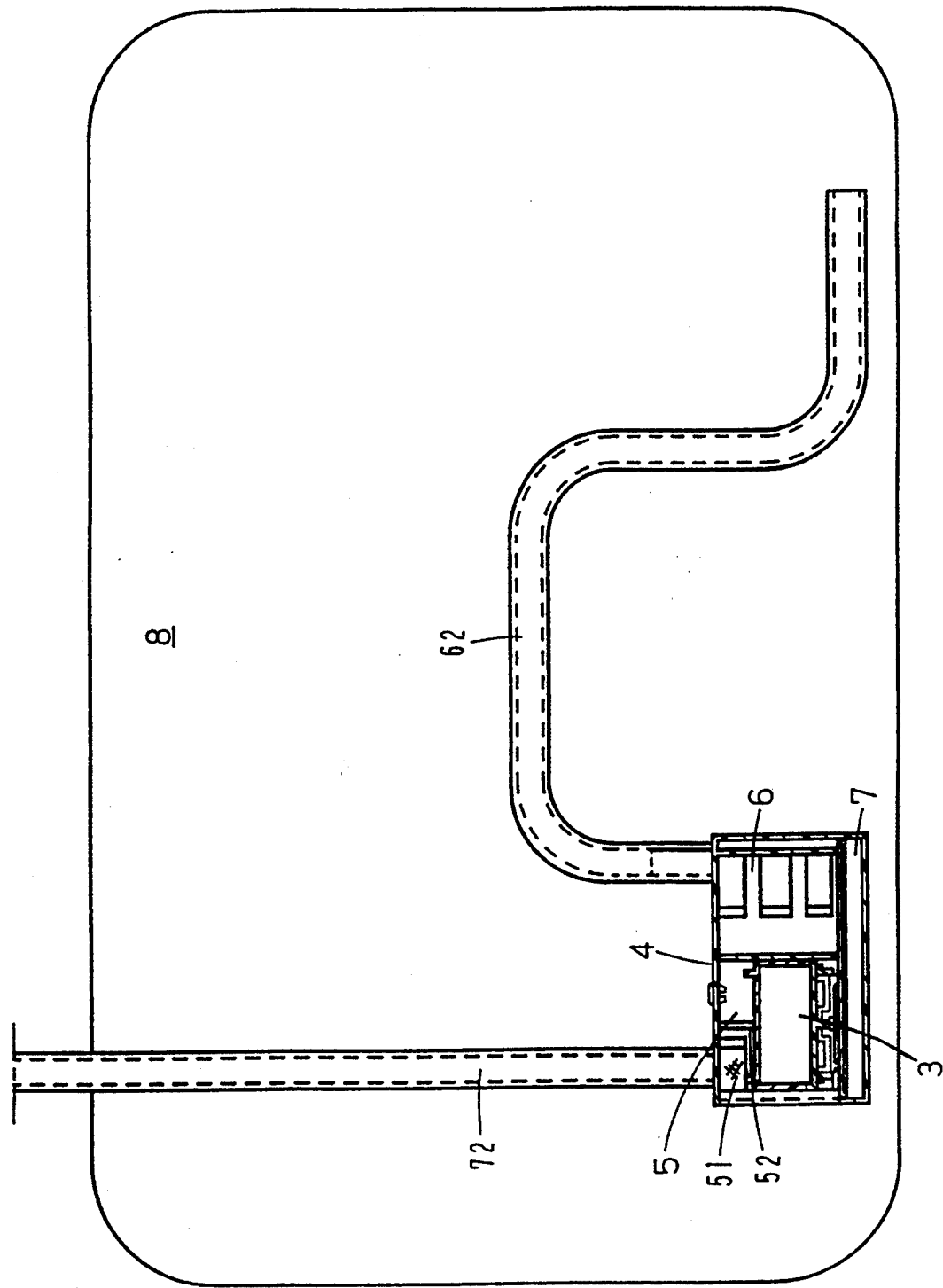
FIG. 16 is a vertical cross-sectional view of a fuel tank.
Figure 17:
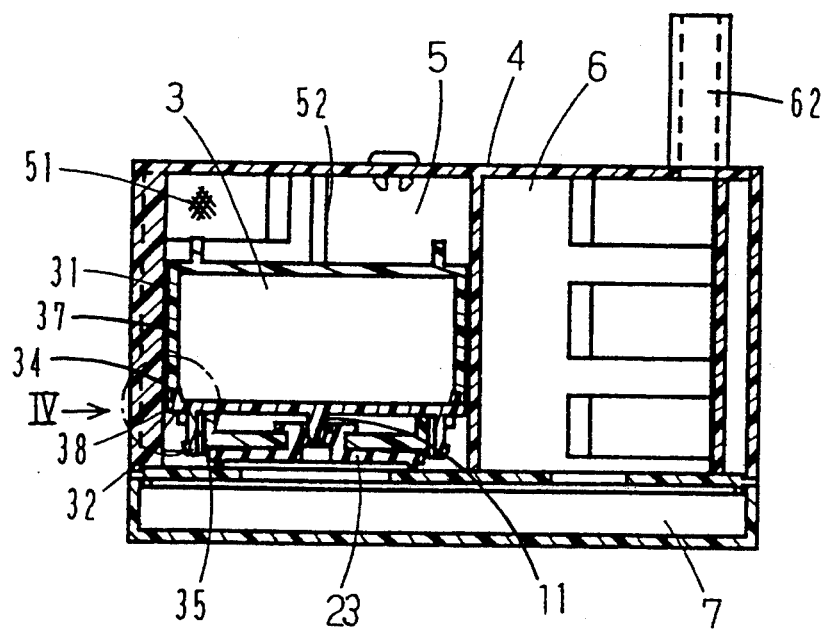
FIG. 17 is a vertical cross-sectional view of a fuel delivery device utilizing a float.
Figure 18:
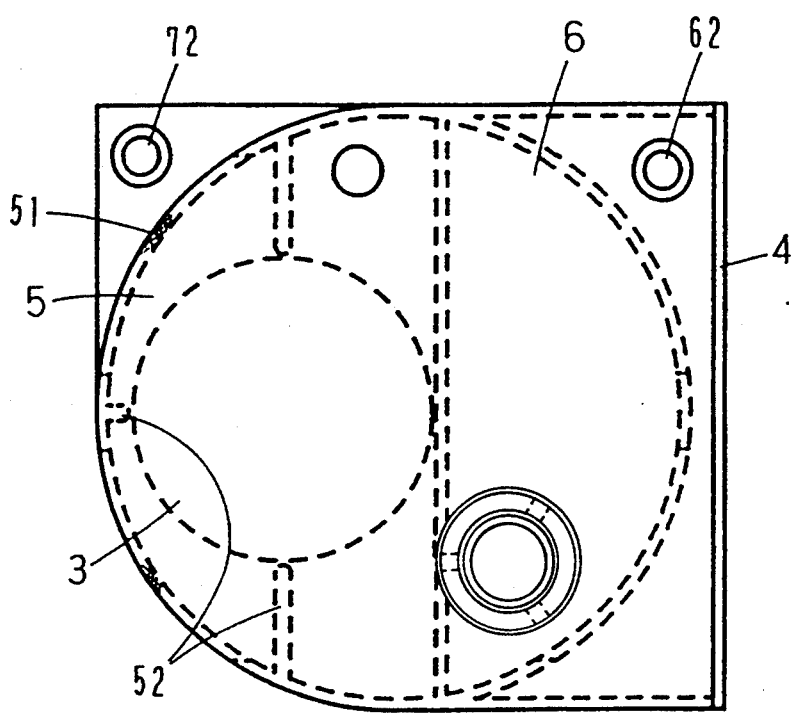
FIG. 18 is a plan view of the device.

As shown in FIGS. 16 to 18, the fuel delivery device has a casing 4 constituted of a float chamber 5, a sub-chamber 6 and a chamber 7, and a float 3 is received in the float chamber 5 in such a manner that a cylindrical side surface 37 of the float 3 is in sliding contact with float guides 52 in the float chamber 5. This fuel delivery device sucks fuel of a fuel tank 8 from a mesh 51 of the float chamber 5 or a fuel intake pipe 62, and supplies it to the engine via a fuel supply pipe 72 from the chamber 7.

The float of the present invention used for the above-described fuel delivery device comprises, as shown in FIGS. 17 to 20, a bottom-open cylinder 31 and a disk 32 having a projecting portion 36 formed on the outer peripheral edge thereof. The fuel delivery device of this embodiment has a double float valve assembly in which the disk 32 and a secondary valve 11 are formed integrally with each other, and the secondary valve 11 is operated in association with a primary valve 23.

Figure 19:
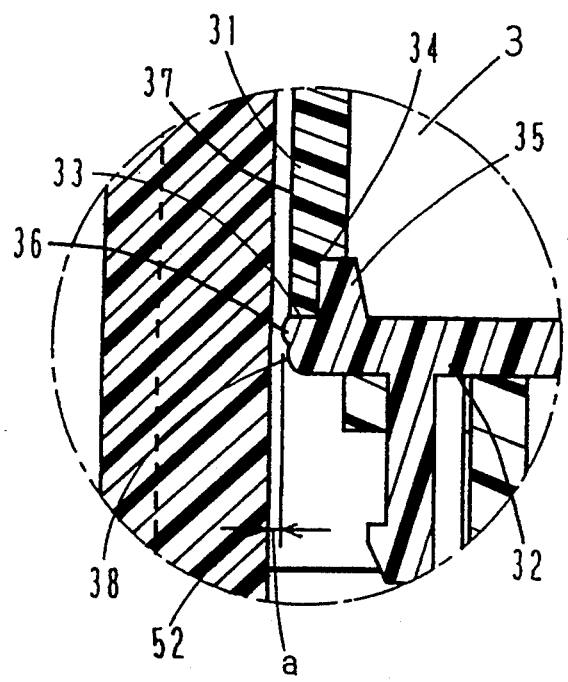
FIG. 19 is an enlarged cross-sectional view of a portion of the device, as viewed in a direction indicated by the arrow IV in FIG. 17.

The cylinder 31 and the disk 32 of the float 3, both of which are made of synthetic resin, are connected with each other by ultrasonic welding. Connection surfaces 33 for this ultrasonic welding have a cross-sectional structure shown in FIG. 19 or 20. The upper surface of the disk 32 on which a fitting ring 35 is formed is closely fitted to the inner surface of the lower end of the cylinder 31 on which a stepped portion 34 is formed, and the connection surfaces 33 are welded to each other. If the component parts have the designed dimensions, the stepped portion 34 and the fitting ring 35 are closely fitted to each other, and as shown in FIG. 19, the projecting portion 36 of the outer peripheral edge 38 of the disk projects from the side surface 37 of the cylinder by a degree corresponding to the height of the projection while defining a gap a from the float guides 52.

Figure 20:
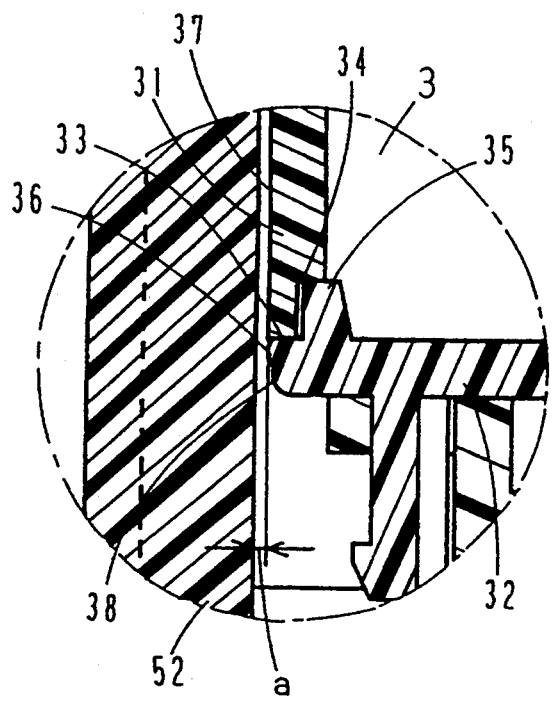
FIG. 20 is an enlarged cross-sectional view of an essential portion of connection surfaces of the float where a cylinder and a disk are connected in a deviated manner.

Actually, however, due to the manufacturing accuracy, the cylinder 31 and the disk 32 are connected but slightly deviated from each other in some cases. As shown in FIG. 20, even if the side surface 37 of the cylinder and the outer peripheral edge 38 of the disk are slightly deviated from each other and surface continuity is deteriorated, the projecting portion 36 lessens this deviation and keeps the gap a from the float guides 52, thereby achieving smooth continuity from the side surface 37 of the cylinder to the outer peripheral edge 38 of the disk.

In the fuel delivery device according to the present invention, the float structure is improved so that even if the machining accuracy is lowered to increase the productivity, the operational reliability can be enhanced. In other words, because allowable ranges of machining accuracy of component parts are enlarged, and because assembly of the float is facilitated, costs in machining and assembling operations can be reduced. This also leads to a decrease in the labor of operators.

Moreover, allowable ranges of connection accuracy of component parts are larger than the conventional ranges. Therefore, even if the surface of the float has a stepped portion, the float is not caught by the float guides, so that smooth movement of the float is ensured, thus improving the reliability as the fuel delivery device.

What is claimed is:

1. A fuel delivery device to be installed at a bottom of a fuel tank, said fuel delivery device being a casing divided into three chambers that comprises a float chamber which includes a check valve at an upper portion of said float chamber and a float valve body inside of said float chamber, a sub chamber which includes a fuel suction pipe at an upper portion of said sub chamber, and a chamber which communicates said float chamber and said sub chamber at bottoms thereof, said float valve comprising a multi-stage valve assembly, including a plurality of valves, in which an uppermost valve is connected to a float, and slide members which have stoppers provided on the distal ends thereof and are provided on one of the valves which make a pair, are inserted in guide members provided on the other valve in such a manner that the stoppers can be engaged with the guide members, and said valve float being comprised of a cylinder with an open bottom and a disk, the disk having around the outer periphery a projecting portion so that said disk is slightly larger in diameter than said cylinder.

2. A fuel delivery device of a fuel tank according to claim 1, wherein said multi-stage valve assembly comprises a two-stage valve assembly in which secondary valve means are connected to the float, said secondary valve means including a small-diameter secondary valve and slide members having stoppers provided on the distal ends thereof, and a large-diameter primary valve is connected to said secondary valve, said primary valve including a secondary valve seat of the secondary valve and guide members in which said slide members are inserted and with which the stoppers are engaged, so that the secondary valve and the primary valve are operated in association with each other.

3. A fuel tank delivery device of a fuel tank according to claim 1, wherein said multi-stage valve assembly comprises a three-stage valve assembly comprising a secondary valve, an intermediate valve and a primary valve, in which the secondary valve has a small diameter and includes slide members having stoppers provided on distal ends thereof, the primary valve has a large diameter and includes guide members, and the intermediate valve has a diameter larger than said secondary valve and smaller than said primary valve and includes slide members having stoppers provided on distal ends thereof and guide members, said valves being connected by connecting the secondary valve to the float, inserting the slide members of the secondary valve in the guide members of the intermediate valve, and inserting the slide members of the intermediate valve in the guide members of the primary valve.

4. A fuel supply device for a fuel tank according to claim 3, wherein in said three-stage valve assembly, guide members of said primary valve, slide members of said secondary valve and slide members and guide members of said intermediate valve are identical in shape and provided concentrically.

* * * * *